(12) United States Patent
Lovell

(10) Patent No.: US 7,069,948 B2
(45) Date of Patent: Jul. 4, 2006

(54) VALVE TRAVEL INDICATOR

(75) Inventor: Michel Ken Lovell, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 184 days.

(21) Appl. No.: 10/353,641

(22) Filed: Jan. 29, 2003

(65) Prior Publication Data

US 2004/0144428 A1    Jul. 29, 2004

(51) Int. Cl.
*F16K 37/00* (2006.01)

(52) U.S. Cl. .................................. 137/556.3; 116/277

(58) Field of Classification Search ................ 137/556, 137/556.3; 116/277
See application file for complete search history.

(56) References Cited

U.S. PATENT DOCUMENTS

| | | | | |
|---|---|---|---|---|
| 141,839 A | * | 8/1873 | Walsh | 116/277 |
| 179,535 A | * | 7/1876 | Dixon | 116/277 |
| 319,939 A | * | 6/1885 | Tudor | 137/556.3 |
| 422,449 A | * | 3/1890 | Robinson et al. | 116/277 |
| 670,326 A | * | 3/1901 | Mullen | 116/277 |
| 693,315 A | * | 2/1902 | Soderlund | 116/277 |
| 786,915 A | * | 4/1905 | McGowen | 137/556.3 |
| 1,017,224 A | * | 2/1912 | MacBeth | 116/277 |
| 1,103,917 A | * | 7/1914 | Lawson | 116/277 |
| 1,128,426 A | * | 2/1915 | Dunham | 116/277 |
| 1,365,543 A | * | 1/1921 | Regenold | 137/556 |
| 1,575,119 A | * | 3/1926 | Lorraine | 137/556.3 |
| 1,799,143 A | * | 4/1931 | Bailey | 137/556.3 |
| 2,266,290 A | * | 12/1941 | Weiss | 137/556 |
| 2,527,814 A | | 10/1950 | Hanssen | 137/153 |
| 3,482,596 A | | 12/1969 | Jones | 137/556 |

FOREIGN PATENT DOCUMENTS

DE          1119073        12/1961

OTHER PUBLICATIONS

"Type 357 Control Valve" Emerson Process Management Product Bulletin, 51.2:357 May 2002, © Fisher Controls International, Inc. 1991, 2002 (15 pages).
"Design D and DA Valves" Fisher-Rosemount Instruction Manual, Form 1777, May 2001, © Fisher Controls International, Inc. 1991, 2002 (11 pages).
International Search Report in PCT/US03/39331 dated May 10, 2004.

* cited by examiner

*Primary Examiner*—John Rivell
(74) *Attorney, Agent, or Firm*—Marshall, Gerstein & Borun LLP

(57) ABSTRACT

A valve travel indicator is described. An indicator portion indicates a location on a valve indicator scale. A retaining portion is fixedly coupled to the indicator portion and movably coupled to a valve stem. The retaining portion fixedly couples the indicator portion to the valve stem during movement of the valve stem and movably couples the indicator portion to the valve stem in response to a predetermined force level exerted upon the indicator portion.

12 Claims, 3 Drawing Sheets

VALVE TRAVEL INDICATOR

TECHNICAL FIELD

This invention relates in general to valves, and more specifically, to a valve travel indicator.

BACKGROUND

Valves are used in many industries to control the flow of liquids and gases. Many of the valves are automated such that the valves can be opened and closed from a remote location, such as by a computer control system. Thus, many of these valves may only be inspected by a human at periodic intervals, such as during annual inspections or while resolving valve operation problems. Valve travel indicators have been used in many valve systems to indicate whether a valve is open, closed or partially open. These valve travel indicators are often located in an open portion of a yoke used to couple the valve to a control mechanism, such as an actuator.

SUMMARY

According to one embodiment of the present invention, a valve travel indicator associated with a control valve is described. The valve travel indicator includes an indicator portion that shows a location on a valve indicator scale. The valve indicator scale represents the position of a valve plug relative to a valve seat to indicate whether the control valve is open, partially open, or closed. The valve travel indicator also includes a retaining portion that is fixed to a valve plug stem with a predetermined breakaway force. The breakaway force is selected to prevent movement of the indicator with respect to the valve stem during normal operation of the control valve while allowing movement of the valve travel indicator relative to the valve stem when the breakaway force is exceeded. The present invention provides various technical advantages. Various embodiments of the present invention may provide all, some or none of these technical advantages. One such technical advantage is the capability to manually manipulate the valve travel indicator on a valve stem without tools by sliding the indicator along the valve plug stem. For example, the breakaway force may be selected such that a human can align the valve travel indicator with the valve indicator scale or completely remove the valve travel indicator without the use of tools. Another such technical advantage is the capability of the valve travel indicator to move relative to the valve stem if an obstruction proximate to the valve travel indicator or the valve indicator scale is encountered. Also, manufacturing costs by may be decreased by using a valve indicator scale cast as part of a valve and/or a yoke instead of using a separate, adjustable indicator scale with a valve travel indicator fixed to the valve stem.

BRIEF DESCRIPTION OF THE DRAWINGS

The present invention is best understood from the detailed description which follows, taken in conjunction with the accompanying drawings, in which.

DETAILED DESCRIPTION

Figure 1:
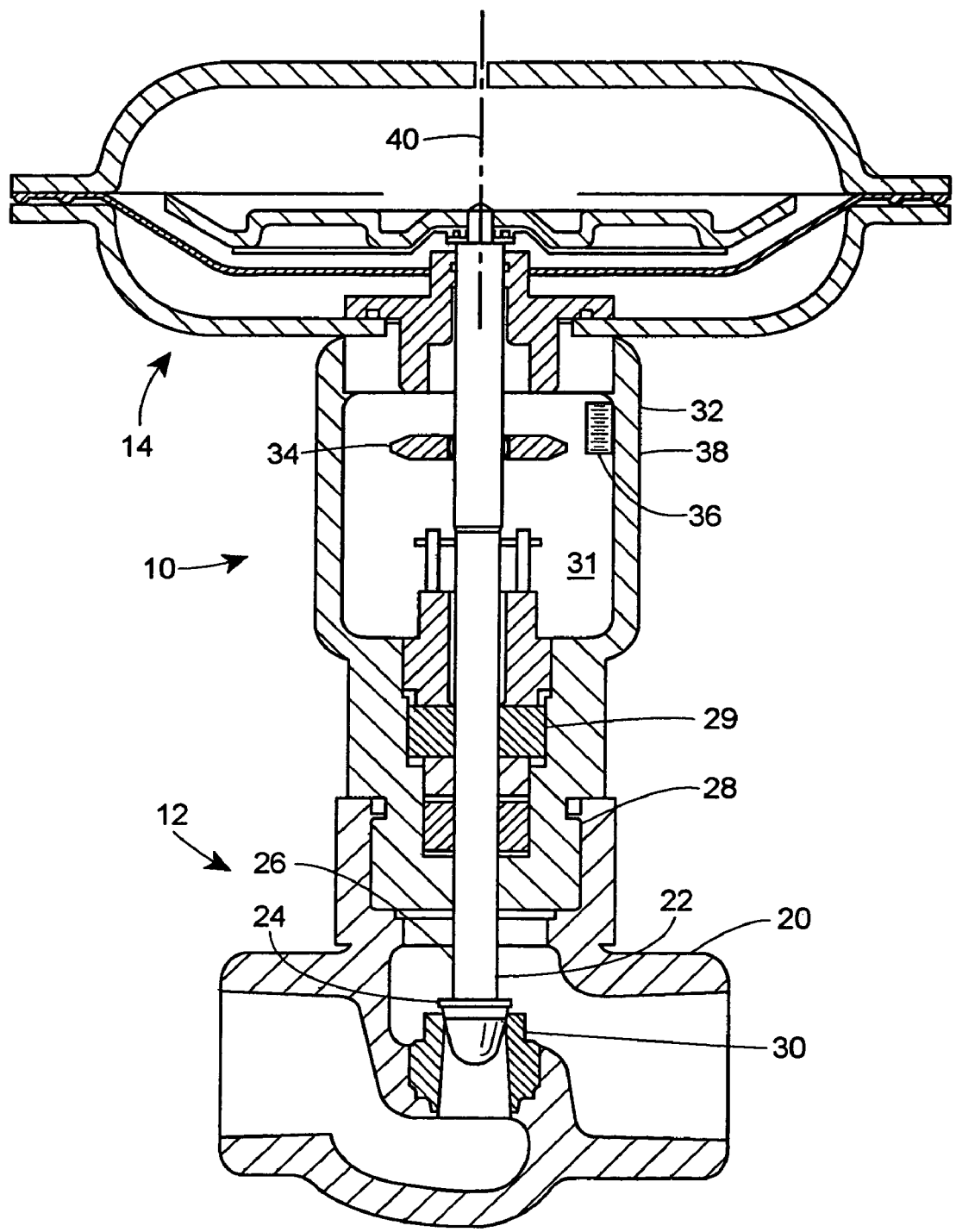
FIG. 1 is a cross-sectional view illustrating a valve according to one embodiment of the present invention.

FIG. 1 is a cross-sectional view illustrating a control valve assembly 10 according to one embodiment of the present invention. Control valve assembly 10 may comprise a valve 12 and an actuator 14 (partially depicted).

Valve 12 may comprise a valve body 20 and a moveable operator 22 including a valve plug 24 attached to a valve stem 26 to control the flow of materials, such as liquids and gases. Additionally, valve body 20 includes a valve packing box 28 and valve packing 29 to create a fluid seal and a guiding surface for valve stem 26. As known to those skilled in the art, the valve stem is typically polished to approximately a 4 micron Ra (arithmetic average) finish to reduce valve packing degradation and increase control valve assembly cycle life.

Valve stem 26 is mechanically coupled (not shown) to actuator 14 that applies an axial force to valve stem 26 to control the relative position of valve plug 24 with respect to a valve seat 30. The relative position of valve plug 24 creates a variable orifice within control valve assembly 10 to modulate and control the fluid flow through control valve assembly 10. As known to those in the art, the axial force exerted by actuator 14 may be provided by pressurized air supplying a conventional spring and diaphragm actuator. In one embodiment, valve stem 26 comprises a generally cylindrically shaped rod having a generally smooth surface. In one embodiment, valve plug stem 26 is 0.375 inches in outer diameter and may alternatively range from 0.375 inches to 2 inches in outer diameter.

A yoke opening 31 in an actuator yoke 32 provides access to valve stem 26 and a valve travel indicator 34 (described in greater detail below). In one embodiment, yoke opening 31 is 1 inch to 2 inches in height and is 2 inches to 3 inches in width. Alternatively, yoke opening 31 may range in height from 1 inch to 26 inches and in width from 2 inches to 7 inches.

Indicator scale 36 comprises a portion of control valve assembly 10 used with valve travel indicator 34 to indicate whether valve 12 is open, partially open, or closed. In one embodiment, indicator scale 36 may have gradations or marks upon an inner surface 38 to approximately quantify the relative position of the valve plug 24 with respect to valve seat 30. Valve travel indicator 34 comprises a generally circular element movably coupled to valve stem 26. Various embodiments of valve travel indicator 34 are described in association with FIGS. 2, 3, 4 and 5.

As understood by those skilled in the art, valve 12 is opened and closed by sliding valve stem 26 axially along a longitudinal axis 40 defined by valve stem 26. As valve stem 26 moves away from the valve body 20, valve plug 24 is pulled upwards and opens valve 12. As valve stem 26 moves towards the valve body 20, valve plug 24 is pushed downward and closes valve 12. The movement of valve stem 26 will change the position of valve travel indicator 34 with respect to indicator scale 36. The position of valve travel indicator 34 with respect to indicator scale 36 provides a visual and/or mechanical indication local to valve 12 of the relative position of valve plug 24. Furthermore, valve travel indicator 34 may be used to determine the condition of valve 12. If valve travel indicator 34 does not correspond to a commanded travel, it may indicate a maintenance or operational problem within control valve assembly 10. For example, valve 12 may be set in a partially open position that only allows a portion, such as 30%, of the valve's flow capacity to be used. As valve 12 is used, wear on valve 12 may change the position of valve plug 24 needed to get a desired flow rate. A technician may visually, mechanically, electronically or otherwise inspect valve travel indicator 34. For example, if the technician notices that valve travel indicator 34 does not indicate a position corresponding to a 30% flow rate, the technician may conclude that valve plug 24 has eroded and therefore is to be repaired or replaced.

Automated systems for valve control may require calibration with respect to the individual valves the automated system is controlling. For example, generalized control and monitoring systems may be used to control various sizes of valves. Valve travel indicator 34 may be used to calibrate the automated system. For example, one technician may visually or mechanically determine the position of valve travel indicator 34 for a particular valve and communicate that information to another technician responsible for calibrating the automated system controlling the particular valve.

Figure 2:
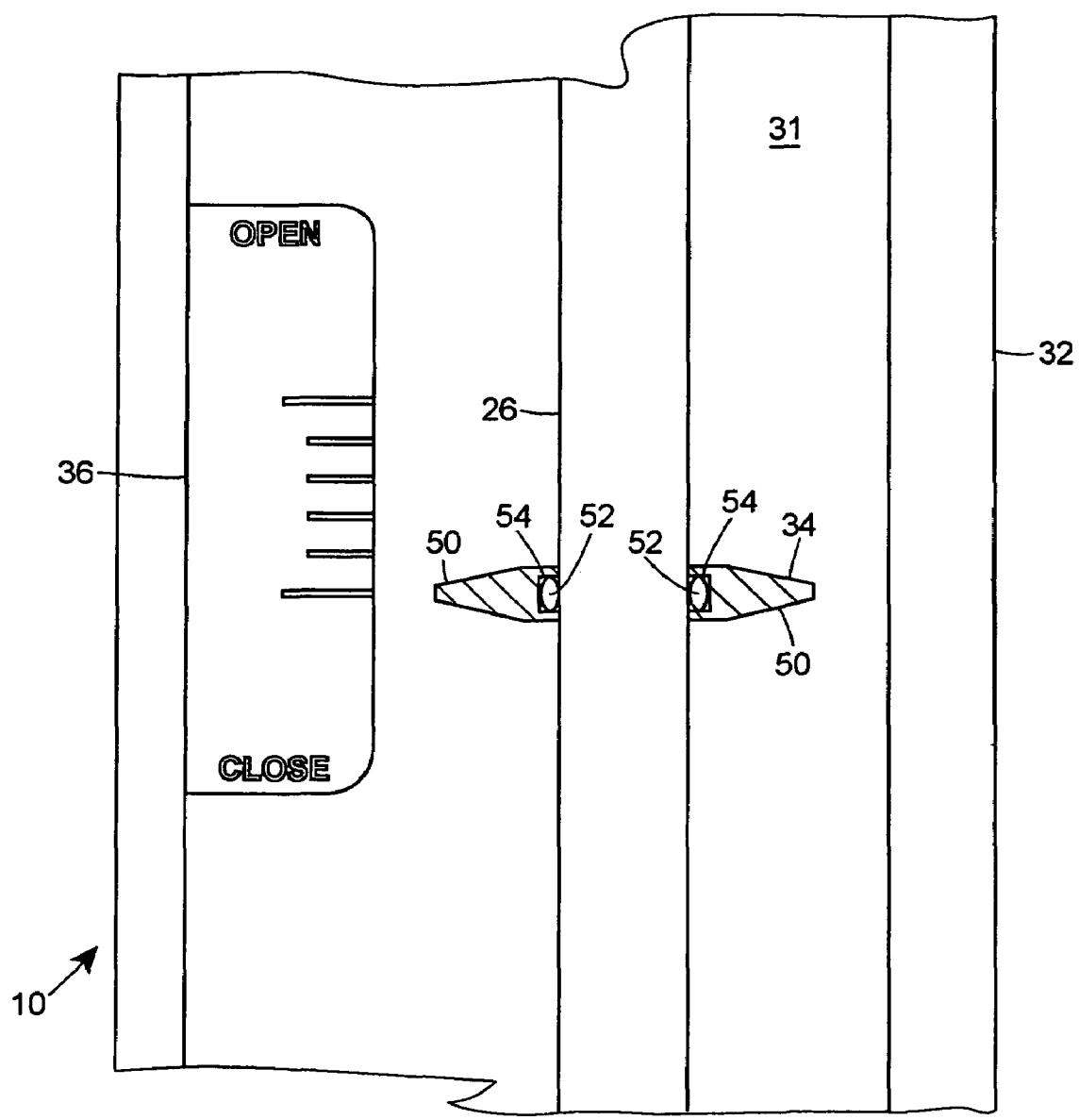
FIG. 2 is a cross-sectional view illustrating further details of a valve travel indicator associated with the valve according to one embodiment of the present invention.

FIG. 2 is a cross-sectional view illustrating further details of valve travel indicator 34 according to one embodiment of the present invention. Valve travel indicator 34 further comprises an indicator portion 50 and a retaining portion 52.

Indicator portion 50 comprises a generally circular, tapered disk with a central opening disposed therethrough. Indicator portion 50 further comprises a portion of valve travel indicator 34 indicating the current position of valve plug 24 with respect to indicator scale 36.

In one embodiment, indicator portion 50 further comprises a cavity 54. Retaining portion 52 may be disposed within cavity 54 and retained within cavity 54. Retaining portion 52 may be retained within cavity 54 by friction, force and/or the design of retaining portion 52 such that retaining portion 52 is not generally permitted to escape from cavity 54 during movement of indicator portion 50 with respect to valve stem 26.

Retaining portion 52 comprises a portion of valve travel indicator 34 operable to movably couple indicator portion 50 to valve stem 26. In one embodiment, retaining portion 52 may comprise an element providing a friction coupling between indicator portion 50 and valve stem 26, such as an o-ring. Retaining portion 52 may be selected such that valve travel indicator 34 is relatively fixed to valve plug stem 26 during normal use and operation of valve stem 26, while allowing valve travel indicator 34 to be moved in response to a predetermined level of force upon valve travel indicator 34. The level of force may be determined using suitable criteria. For example, the level of force may be selected to allow valve travel indicator 34 to be manually moved by a human without tools while not allowing valve travel indicator 34 to be moved during normal operation of valve stem 26. In one embodiment, about 4–25 pounds of force are required to move valve travel indicator 34 with respect to valve stem 26, but other suitable levels of force may be used.

In operation, valve travel indicator 34 is initially aligned with indicator scale 36. For example, valve 12 may be fully closed and valve travel indicator 34 manually aligned with the fully closed marking on indicator scale 36; however, any suitable technique for aligning valve travel indicator 34 and indicator scale 36 may be used. As valve travel indicator 34 moves with valve stem 26, the tapered end of indicator portion 50 may be used with markings on indicator scale 36 to determine whether valve 12 is open, closed or only partially open. Allowing manual alignment, such as by a human in the field, of valve travel indicator 34 provides improved functionality and decreased cost for valve 12.

As valve stem 26 moves up and down to open and close valve 12, valve travel indicator 34 moves up and down relative to indicator scale 36. The position of valve travel indicator 34 with respect to indicator scale 36 provides a visual and/or mechanical indication local to valve 12 of the status of valve 12. For example, a technician visually inspecting the status of valve 12 can see whether valve 12 is open, closed or partially open.

One traditional valve travel indicator involved etching a groove into the valve stem and then aligning the indicator scale with the groove. This technique increased the cost of the valve because of the need for a separate, movable indicator scale which typically required a screwdriver or other tools for alignment. In contrast, one embodiment of valve travel indicator 34 may allow a human without tools to align travel indicator 34 by sliding valve travel indicator 34 to a suitable location on the smooth valve stem 26 relying upon the friction between valve stem 26 and retaining portion 52 to fix valve travel indicator 34 in position. Further, valve travel indicator 34 may allow indicator scale 36 to be formed as part of valve 12 and/or actuator 14, which may decrease the cost of valve 12 by eliminating the use and manufacture of the separate, movable indicator scale of traditional designs.

As valve travel indicator 34 is movably coupled to valve stem 26, ease of disassembly of control valve assembly 10 may also be increased. More specifically, as moveable operator 22 is removed from the control valve assembly 10, valve travel indicator 34 can easily be slid from valve stem 26 without the use of tools. Valve stem 26 may be reinserted into valve 12 through retaining portion 52 during the reassembly process and valve travel indicator 34 may then be re-aligned with respect to indicator scale 36.

Also, valve travel indicator 34 may support a decrease in the injuries suffered by technicians working with control valve assembly 10. As known to those skilled in the art, traditional valve travel indicators are rigidly coupled to the valve stem and could catch a technician's hand or a portion of the hand while the technician was working on the valve. In contrast, valve travel indicator 34 may avoid injury to the hands of the technician by slipping on valve stem 26 instead of damaging the technician's hand. More specifically, as valve travel indicator 34 is movably coupled to valve stem 26, if valve travel indicator 34 encounters an obstruction in the path of valve travel indicator 34, valve travel indicator 34 may begin to slide along valve stem 26 instead of crushing the obstruction. For example, the obstruction may comprise cumulative debris such as ice or an improperly mounted valve accessory, such as a position transmitter or a pressure regulator. Further, valve travel indicator 34 may increase the operational lifetime of control valve assembly 10 by sliding along valve stem 26 in response to the obstruction instead of impacting the obstruction and possibly damaging control valve assembly 10 with the impact.

Figure 3:
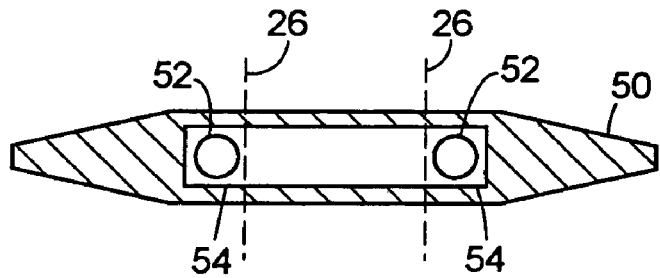
FIG. 3 is a cross-sectional view of the valve travel indicator according to one embodiment of the present invention.

FIG. 3 is a cross-sectional view of valve travel indicator 34 according to one embodiment of the present invention. In one embodiment, indicator portion 50 has an outer diameter of 1.5 inches and an inner diameter of 0.8 inches. Alternatively, indicator portion 50 may have an outer diameter from 1.5 inches to 7 inches and an inner diameter from 0.375 inches to 2 inches. The taper begins relatively close to the inner diameter and tapers to the outer diameter. In one embodiment, the tapered portion of indicator portion 50 extends 0.7 inches from the outer diameter. Indicator portion 50 is 0.21 inches in height and tapers to 0.06 inches in height at the end of the tapered portion. Alternatively, indicator portion 50 may have a height ranging from 0.21 inches to 0.5 inches and the edge of the taper may range from 0.05 inches to 0.1 inches in height. In one embodiment, indicator portion 50 has an outer length slightly less than the inner diameter of yoke opening 31, such that indicator portion 50 has an edge disposed proximate to indicator scale 36. For example, if the inner diameter of yoke opening 31 is 2 inches, indicator portion 50 may have an outer diameter of slightly less than 2 inches so that the position of indicator portion 50 relative to indicator scale 36 may be more easily determined.

Cavity 54 has an outer diameter of 0.673 inches, an inner diameter of 0.5 inches and a height of 0.135 inches. Alternatively, cavity 54 may have an outer diameter ranging from 0.673 inches to 2.2 inches, an inner diameter ranging from 0.5 inches to 2 inches, and a height ranging from 0.135 inches to 0.145 inches.

Indicator portion 50 may be made from any suitable material, such as plastic or metal, based on the environment valve travel indicator 34 is to be used in, cost and other suitable criteria. In one embodiment, indicator portion 50 is made from ultraviolet stabilized acrylonitrile styrene acrylate (ASA). Alternatively, indicator portion 50 may be made from brass, aluminum, or other suitable metals or plastics. In general, the selection of material for indicator portion 50 may be based on the expected environment of valve 12 to increase the lifetime of indicator portion 50. For example, indicator portion 50 may be exposed to environmental factors such as corrosive and non-corrosive fluids, temperature extremes, high or low humidity levels, precipitation, snow, and ozone.

In one embodiment, retaining portion 52 comprises an o-ring. The outer diameter, material and thickness of retaining portion 52 is selected based on the diameter of valve stem 26 such that retaining portion 52 grips valve stem 26 with sufficient force to support indicator portion 50 and maintain the position of indicator portion 50 with respect to valve stem 26 during normal operation of valve stem 26. The outer diameter, material and thickness of retaining portion 52 may also be selected such that retaining portion 52 does not grip valve plug stem 26 with excessive force that would prevent movement of indicator portion 50 by a human without tools or prevent removal of valve plug stem 26 from valve 12 during disassembly. In this embodiment, retaining portion 52 has an inner diameter of 0.5 inches, an outer diameter of 0.6875 inches, a cross-sectional diameter of 0.09375 inches and is formed from 70 durometer-shore A nitrite. Alternatively, retaining portion 52 may have an inner diameter of from 0.480 inches to 2 inches, an outer diameter of 0.6875 inches to 2.1875 inches, a cross-sectional diameter ranging from 0.09375 inches to 0.106 inches and may be formed from fluoro-elastomer, ethylene-propylene or any suitable rubber-like material with an appropriate hardness rating capable of handling the expected environmental factors such as ozone and extreme temperature changes.

In another embodiment, valve travel indicator 34 may comprise a generally homogeneous piece of material operable to provide a suitable interference fit between valve stem 26 and valve travel indicator 34. This embodiment may be used without retaining portion 52 and cavity 54 as the material used to form indicator portion 50 provides the interference fit with respect to valve stem 26 and indicator portion 50 comprises the whole of valve travel indicator 34. For example, indicator portion 50 may comprise a single piece of hard rubber, such as 90 durometer shore-A ethylene-propylene. Indicator portion 50 may be formed from one or more individual pieces that are suitably coupled together. In this embodiment, suitable materials may be selected for indicator portion 50 that provide sufficient friction force to allow valve travel indicator 34 to operate as described above.

Further, as valve travel indicator 34 may be used with smooth valve stems while avoiding damage to the smooth valve stem. For example, valve stem 26 may, in one embodiment, be polished to a 4 micron Ra finish. More specifically, by sliding along valve stem 26 valve travel indicator 34 avoids damaging valve stem 26 when an obstruction is encountered and when valve stem 26 is removed from valve 12. When smooth valve stems are scraped, nicked or otherwise damaged, the damage to the smooth valve stem may damage the valve during normal operation. For example, a nicked smooth valve stem may damage the packing in the valve as the stem moves in and out of the valve and the damaged packing may cause the valve to leak.

Figure 4:
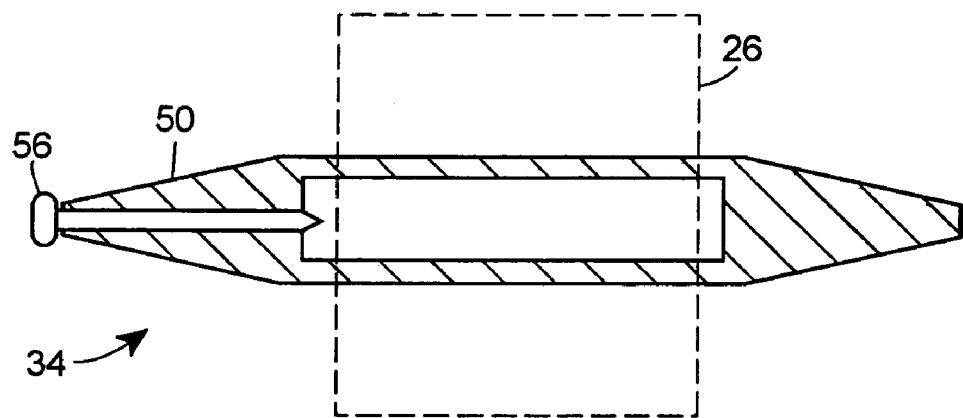
FIG. 4 is a cross-sectional view of the valve travel indicator according to an alternative embodiment of the present invention.

FIG. 4 is a cross-sectional view of valve travel indicator 34 according to one embodiment of the present invention. Retaining portion 52 may alternatively comprise a set screw 56 according to one embodiment of the present invention. Set screw 56 is disposed through indicator portion 50 perpendicular to valve stem 26 and operates to movably couple indicator portion 50 to valve stem 26. More specifically, by tightening set screw 56 against valve stem 26, indicator portion 56 may be movably coupled to valve stem 26. The amount of force needed to move valve travel indicator 34 may be determined by the tightness of set screw 56. Set screw 56 may comprise a suitable set screw, such as a nylon tipped, plastic set screw, or other suitable fastener, suitable for use in the environment surrounding valve travel indicator 34.

Figure 5:
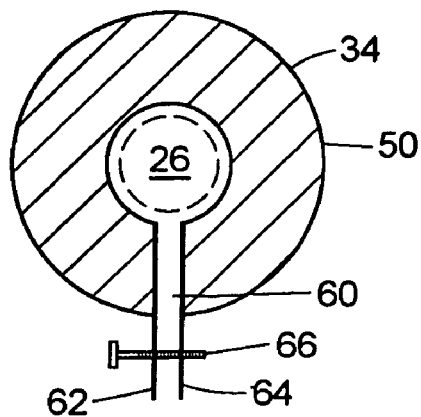
FIG. 5 is a top view of the valve travel indicator according to another alternative embodiment: of the present invention.

FIG. 5 is a top view of valve travel indicator 34 according to one embodiment of the present invention. In this embodiment, indicator portion 50 further comprises a channel 60. Channel 60 may comprise an appropriately sized cut extending from the outer edge to the inner edge of indicator portion 50 and extending from the top to the bottom of indicator portion 50. The size of channel 60 may be determined based on a desired amount of adjustability in the outer diameter of indicator portion 50. For example, an indicator portion 50 designed to be used with valve stems 26 of various diameters may have a channel 60 of sufficient width to allow indicator portion 50 to fit the various sized valve stems 26.

In one embodiment, retaining portion 52 may comprise a first flange 62, a second flange 64 and a squeeze element 66. First and second flanges 62 and 64 comprise extensions of indicator portion 50 operable to receive squeeze element 66. Squeeze element 66 comprises a suitable element operable to tighten first and second flanges 62 and 64 to decrease the inner diameter of indicator portion 50 such that indicator portion 50 grips valve stem 26. In one embodiment, squeeze element 66 comprises a screw. Alternatively, squeeze element 66 may comprise a suitable element for adjustably closing flanges 62 and 64. In this embodiment, retaining portion 52 movably couples indicator portion 50 to valve stem 26 through tightening of squeeze element 66.

Often, traditional valve travel indicators have been designed in association with larger valve assemblies. As valve assemblies have become smaller, different designs of valve travel indicators may be more appropriate. For example, valve travel indicator 34 may be used with relatively small control valve assemblies 10.

Other changes, substitutions, and alterations are also possible without departing from the spirit and scope of the present invention, as defined by the following claims.

What is claimed is:

1. A valve travel indicator comprising:
   an indicator portion operable to indicate a location on a valve indicator scale; and
   a retaining portion fixedly coupled to the indicator portion and movably coupled to a valve stem, the retaining portion operable to fixedly couple the indicator portion to the valve stem during movement of the valve stem and movably couple the indicator portion to the valve stem in response to a predetermined force level exerted upon the indicator portion, wherein the retaining portion comprises an o-ring.

2. The valve travel indicator according to claim 1, wherein the o-ring is formed from 70 durometer-shore A nitrile.

3. The valve travel indicator according to claim 1, wherein the o-ring is formed from one of fluoro-elastomer or ethylene-propylene.

4. The valve travel indicator according to claim 1, wherein the indicator portion is formed from ultraviolet stabilized acrylonitrile styrene acrylate, and wherein the indicator portion is tapered.

5. The valve travel indicator according to claim 1, wherein the indicator portion further comprises a cavity and wherein the retaining portion is disposed within the cavity.

6. The valve travel indicator according to claim 1, wherein the predetermined force level comprises from 4 pounds of pressure to 25 pounds of pressure.

7. The valve travel indicator according to claim 1, wherein the indicator portion and the retaining portion comprise 90 durometer shore-A ethylene-propylene.

8. The valve travel indicator according to claim 7, wherein the indicator portion and the retaining portion comprise a single element.

9. The valve travel indicator of claim 1, wherein both the indicator portion and the retaining portion are substantially ring shaped.

10. The valve travel indicator of claim 9, wherein the indicator portion and the retaining portion are integral with one another.

11. A valve travel indicator comprising:
    an indicator portion operable to indicate a location on a valve indicator scale and comprising a cavity;
    wherein the indicator portion comprises an outer diameter of 1.5 inches, an inner diameter of 0.8 inches, and is formed from ultraviolet stabilized acrylonitrile styrene acrylate;
    wherein the indicator portion tapers from 0.21 inches in height to 0.06 inches in height;
    wherein the cavity comprises an outer diameter of 0.673 inches, an inner diameter of 0.5 inches and a height of 0.135 inches;
    an o-ring fixedly disposed within the cavity and movably coupled to a valve stem, the o-ring operable to fixedly couple the indicator portion to the valve stem during movement of the valve stem and movably couple the indicator portion to the valve stem in response to a predetermined force level exerted upon the indicator portion;
    wherein the o-ring comprises an inner diameter of 0.5 inches, an outer diameter of 0.6875 inches, a cross-sectional diameter of 0.09375 inches and is formed from 70 durometer-shore A nitrile; and
    wherein the predetermined force level comprises from 4 pounds of pressure to 25 pounds of pressure.

12. A valve travel indicator comprising:
    an indicator portion operable to indicate a location on a valve indicator scale; and
    a retaining portion fixedly coupled to the indicator portion and movably coupled to a valve stem, the retaining portion operable to fixedly couple the indicator portion to the valve stem during movement of the valve stem and movably couple the indicator portion to the valve stem for movement in a longitudinal direction along the valve stem in response to a predetermined force exerted upon the indicator portion,
    wherein the indicator portion further comprises a cavity and wherein the retaining portion is disposed within the cavity.

* * * * *

UNITED STATES PATENT AND TRADEMARK OFFICE
CERTIFICATE OF CORRECTION

PATENT NO. : 7,069,948 B2
APPLICATION NO. : 10/353641
DATED : July 4, 2006
INVENTOR(S) : Michel K. Lovell Page 1 of 1

It is certified that error appears in the above-identified patent and that said Letters Patent is hereby corrected as shown below:

In the Specification:

At Column 2, line 8, "embodiment:" should be -- embodiment --.

At Column 5, line 51, "nitrite" should be -- nitrile --.

Signed and Sealed this

Sixth Day of January, 2009

JON W. DUDAS
*Director of the United States Patent and Trademark Office*